United States Patent
Auxier et al.

(10) Patent No.: US 6,379,251 B1
(45) Date of Patent: Apr. 30, 2002

(54) SYSTEM AND METHOD FOR INCREASING CLICK THROUGH RATES OF INTERNET BANNER ADVERTISEMENTS

(75) Inventors: Robert Auxier, Silver Spring; Vivek Khera, Rockville, both of MD (US); Charles Seidman, Merion, PA (US)

(73) Assignee: RealTime Media, Haverford, PA (US)

( * ) Notice: Subject to any disclaimer, the term of this patent is extended or adjusted under 35 U.S.C. 154(b) by 0 days.

(21) Appl. No.: 09/263,526

(22) Filed: Mar. 5, 1999

Related U.S. Application Data

(63) Continuation-in-part of application No. 08/805,134, filed on Feb. 24, 1997.

(51) Int. Cl.⁷ .................................................. A63F 9/24
(52) U.S. Cl. ........................... 463/42; 463/17; 273/269
(58) Field of Search ............................. 463/1, 9, 11–12, 463/16–19, 25, 29, 30, 36, 40–42; 340/323 R, 825; 700/91, 92; 273/236, 237, 138.1, 138.2, 139, 269; 705/1, 14, 16–17, 39, 41, 44; 709/200–201, 217, 223, 224; 379/114.11

(56) References Cited

U.S. PATENT DOCUMENTS

| | | | |
|---|---|---|---|
| 5,118,109 A | 6/1992 | Gumina | 273/139 |
| 5,231,568 A | 7/1993 | Cohen et al. | 364/401 |
| 5,265,874 A | 11/1993 | Dickinson et al. | 273/138 |
| 5,286,023 A | 2/1994 | Wood | 273/138 |
| 5,324,035 A | 6/1994 | Morris et al. | 273/138 |
| 5,373,440 A | 12/1994 | Cohen et al. | 364/410 |
| 5,407,199 A | 4/1995 | Gumina | 273/139 |
| 5,507,489 A | 4/1996 | Reibel et al. | 273/138 |
| 5,569,082 A | 10/1996 | Kaye | 463/17 |
| 5,586,937 A | 12/1996 | Menashe | 463/41 |
| 5,659,631 A | 8/1997 | Gormish et al. | 382/166 |
| 5,674,128 A | 10/1997 | Holch et al. | 463/42 |
| 5,679,077 A | 10/1997 | Pocock et al. | 463/19 |
| 5,683,090 A | 11/1997 | Zeile et al. | 273/269 |
| 5,695,400 A | 12/1997 | Fennell, Jr. et al. | 463/42 |
| 5,709,603 A | 1/1998 | Kaye | 463/17 |
| 5,722,890 A | 3/1998 | Libby et al. | 463/17 |
| 5,737,560 A | 4/1998 | Yohanan | 395/349 |

FOREIGN PATENT DOCUMENTS

| | | | |
|---|---|---|---|
| GB | 2 147 773 A | 9/1984 | 273/269 |

*Primary Examiner*—Mark Sager
(74) *Attorney, Agent, or Firm*—Antonelli, Terry, Stout & Kraus, LLP

(57) ABSTRACT

A system and method for increasing click-through rates of Internet banner advertisements (ads) is enabled through the delivery of banner ads having a user interactive gaming function. In one embodiment, the user interactive gaming function is implemented as an Internet scratch-off game. The gaming further on the banner ad is completed by the user upon the interaction by the user at a merchant web site. A transfer to the merchant's web site is accomplished using a uniform resource locator request that includes game state information. Automatic transfers to a merchant web site can also be effected based upon indications of user interaction with an interactive portion of a banner ad.

8 Claims, 7 Drawing Sheets

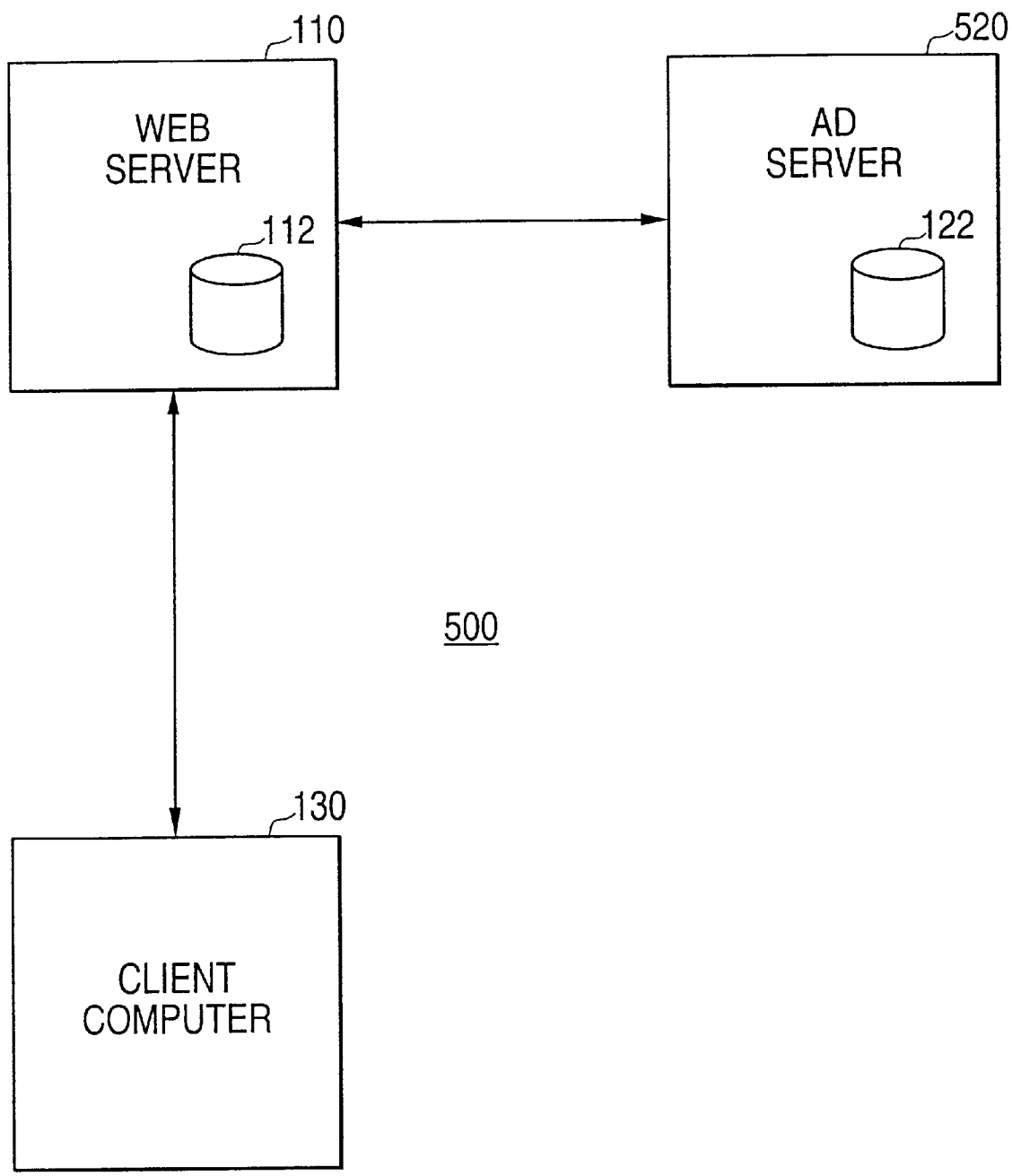

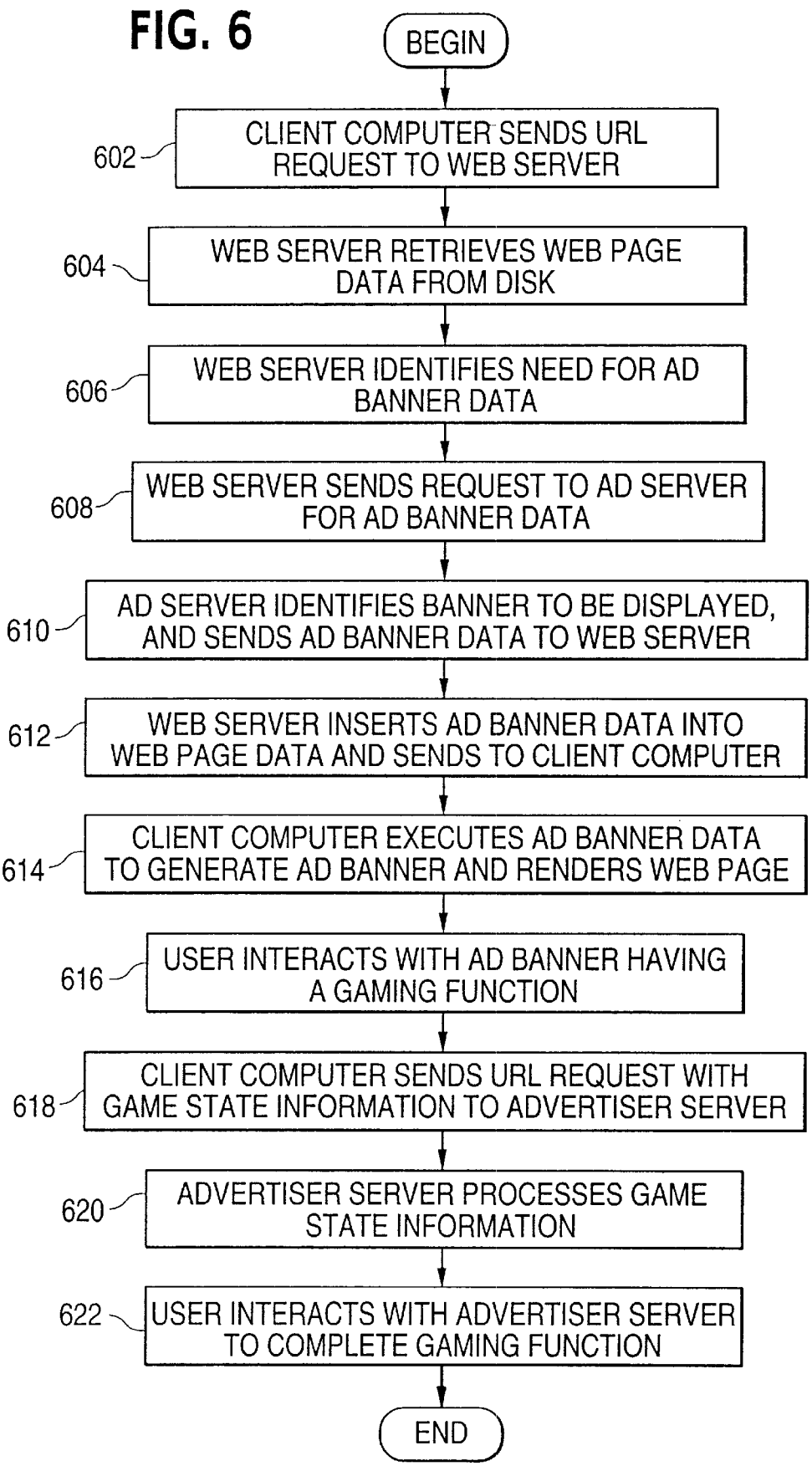

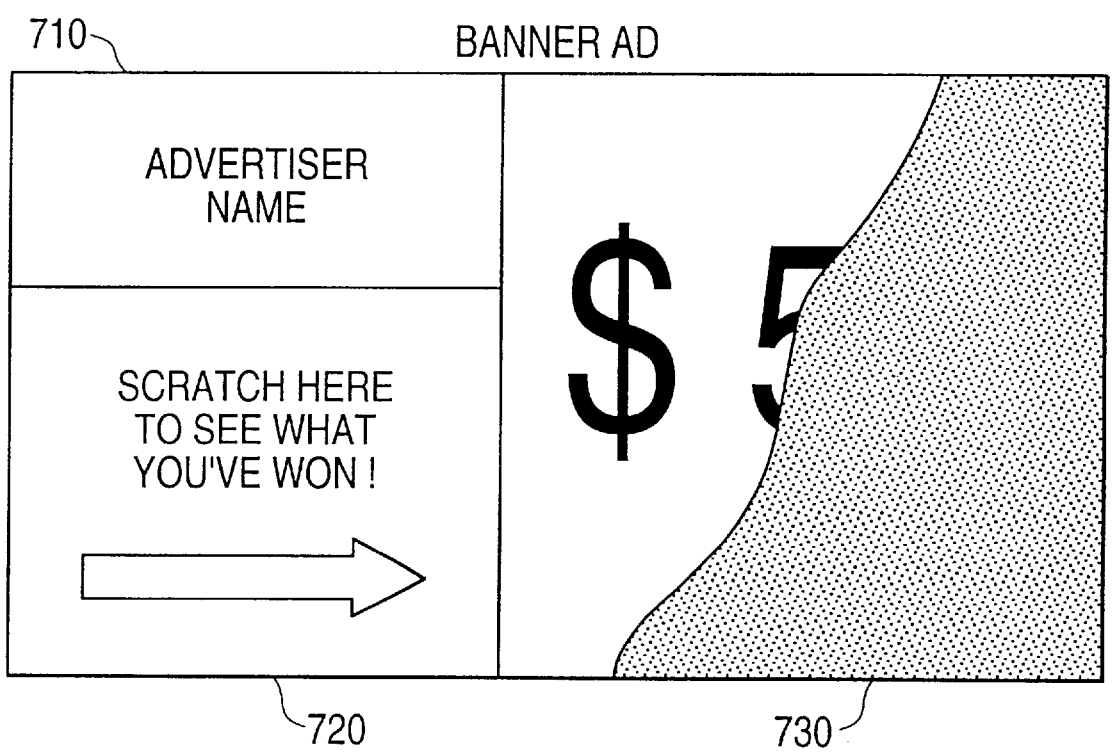

Figure 1:
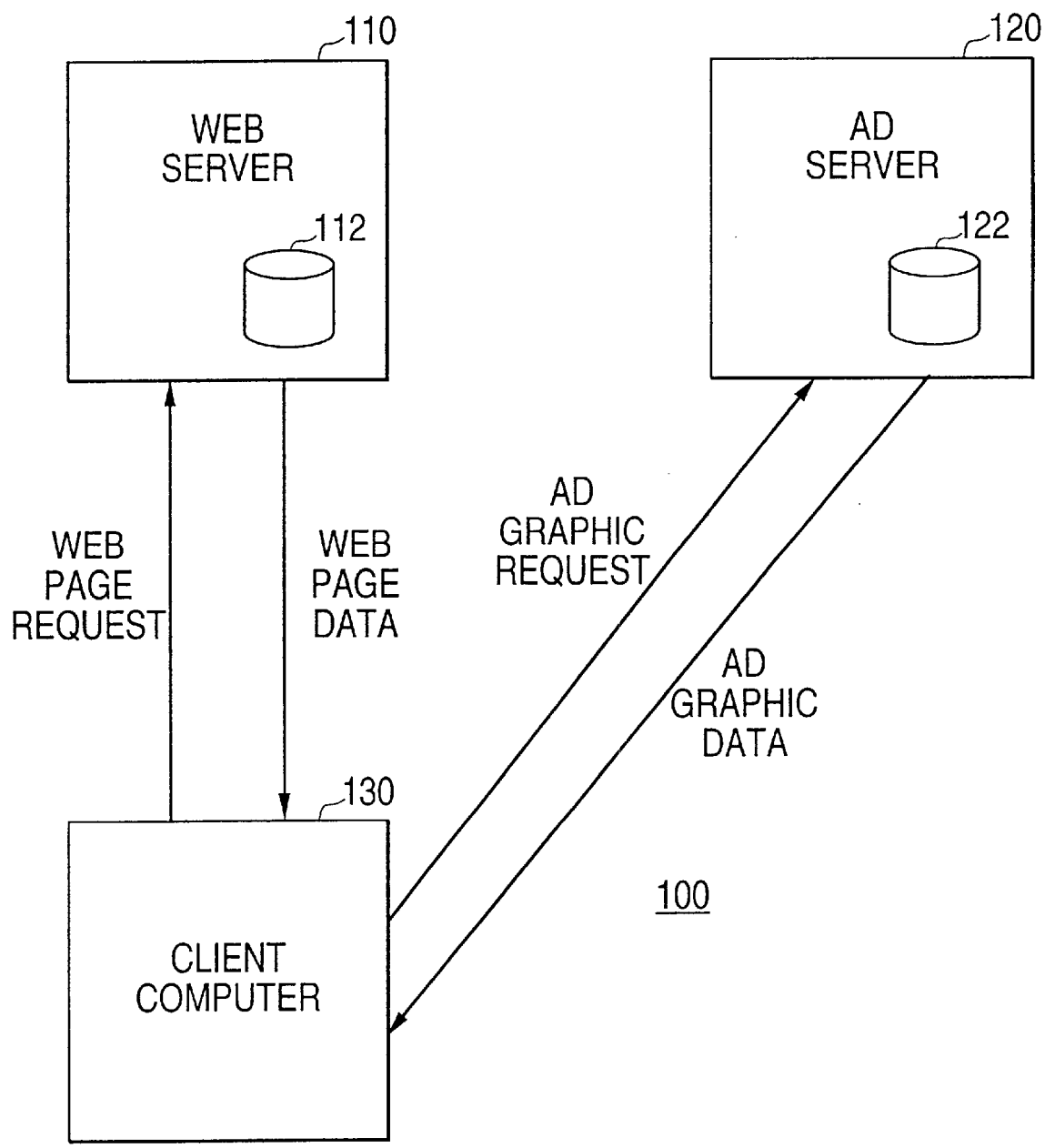

SYSTEM AND METHOD FOR INCREASING CLICK THROUGH RATES OF INTERNET BANNER ADVERTISEMENTS

This application is a continuation-in-part of application Ser. No. 08/805,134, entitled "Internet Scratch-Off Game," filed on Feb. 24, 1997.

BACKGROUND OF THE INVENTION

1. Field of the Invention

The present invention relates generally to Internet advertising, and more specifically, to a system and method for increasing click-through rates of Internet banner advertisements.

2. Discussion of the Related Art

The rapidly expanding presence of the Internet has produced an increased recognition of the importance of web advertising. As compared to more traditional media such as television or radio, advertising on the Web is based on web page views and is more easily quantifiable. In large part, each page view represents a transaction between a client (or user's) computer and a web server. These individual client-server interactions permit more deterministic measures of the reach of particular advertising campaigns. This is in marked contrast to television and radio advertising which rely on surveys to estimate the reach of advertising efforts.

One of the primary forms of web advertising is through banner advertisements (ads). Banner ads typically appear at or near the top of a web page. The banner ads can be delivered by an ad server that tracks the individual deliveries of the banner ads, thereby monitoring the reach of particular web advertising campaigns. The banner ads also represent a link to the advertiser's site, which can be reacted by clicking on the banner ad.

Banner ad packages are typically sold on a cost per thousand impressions basis. An impression or page view, ccurs when a visitor to a web site views a page where a banner ad is displayed. The prices of the banner ad packages typically range from 20–75 dollars per thousand impressions. Many factors influence the price of these banner ad packages.

Ultimately, the success of the banner ad campaign is based upon the levels of positive user response. Positive user response can be reflected through an increase in sales of a product. Alternatively, positive user response can be reflected in the number of "click-throughs." A "click-through" occurs when a visit sees or reads the banner ad and clicks on it, taking them directly to the advertiser's web site.

The click-through rate can be used as the basis for pricing banner ad packages. Thus, instead of a cost per thousand impression the banner ad package can be priced as a cost per click-through. Click-through averages generally range between 0.5% and 2%. For this reason, some web sites try to avoid selling advertising based on click-through rates because a low click-through rate will severely limit ad revenue. What is needed therefore is a system and method for increasing the click-through rates of the banner ads.

SUMMARY OF THE INVENTION

Accordingly, the present invention is directed to a system and method that delivers user interactive banner advertisements (ads) that implement a gaining function. The user completes the gaming function by interacting with an advertiser's web site upon clicking through the banner ad.

In a preferred embodiment, the user interactive banner ad is delivered through the interaction of a client computer with a web server and an ad server. In this process, a client computer first transmits a first uniform resource locator (URL) request to a web server. The client computer subsequently receives web page data from the web server. The web page data includes banner ad data that identifies the source of one or more components (e.g., text, graphic image data, applet executable code, etc.) to be used in rendering a banner ad in the web page defined by the web page data.

The client computer retrieves the components by transmitting a second URL request to an ad server. If the source of the components is applet executable code (e.g., Java applet), then the client computer receives computer program logic for storage on a computer usable medium in the client computer. The computer program logic generally includes a means for enabling a processor in the client computer to implement the user interactive gaming function within a portion of the banner ad. In one example, the computer program logic implements an Internet scratch-off game and includes (1) a first means for enabling a processor in the client computer to display at least one secondary image on a display screen, wherein the secondary image corresponds to a gaming symbol image, and (2) a second means for enabling the processor in the client computer to replace a portion of the secondary image on the display screen with a corresponding portion of the gaming symbol image, wherein the portion defines a display area that corresponds to a display area covered by the movement in a cursor position.

After the user finishes the interaction with the banner ad gaming function (e.g., scratching off the secondary images on the game card), the user transmits a third URL request to a merchant web server that is sponsoring the banner ad. The third URL request includes game state information that is indicative of an input or result of the user interactive gaming function. In one example, the game state information is an identifier of the gaming symbol image that is displayed on the user interactive portion of the banner ad. The game state information is processed by the merchant server to determine whether the user is qualified to win a prize. If the user is qualified to win a prize, the user completes the gaming function (e.g., filling out a prize claim form with name and address information).

It is a feature of the present invention that the click-through process can be integrated with the user actions that are carried out in a user interactive area of a banner ad. Various scenarios can be implemented such that a user is automatically transferred to a merchant web site. For example, the system can be designed to initiate a click-through upon the stoppage of the user's scratching, after the lapse of a predetermined period of time (e.g., 2 seconds) after the user has initiated scratching, after the system determines that enough of the cover image has been scratched off, etc.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

Figure 2:
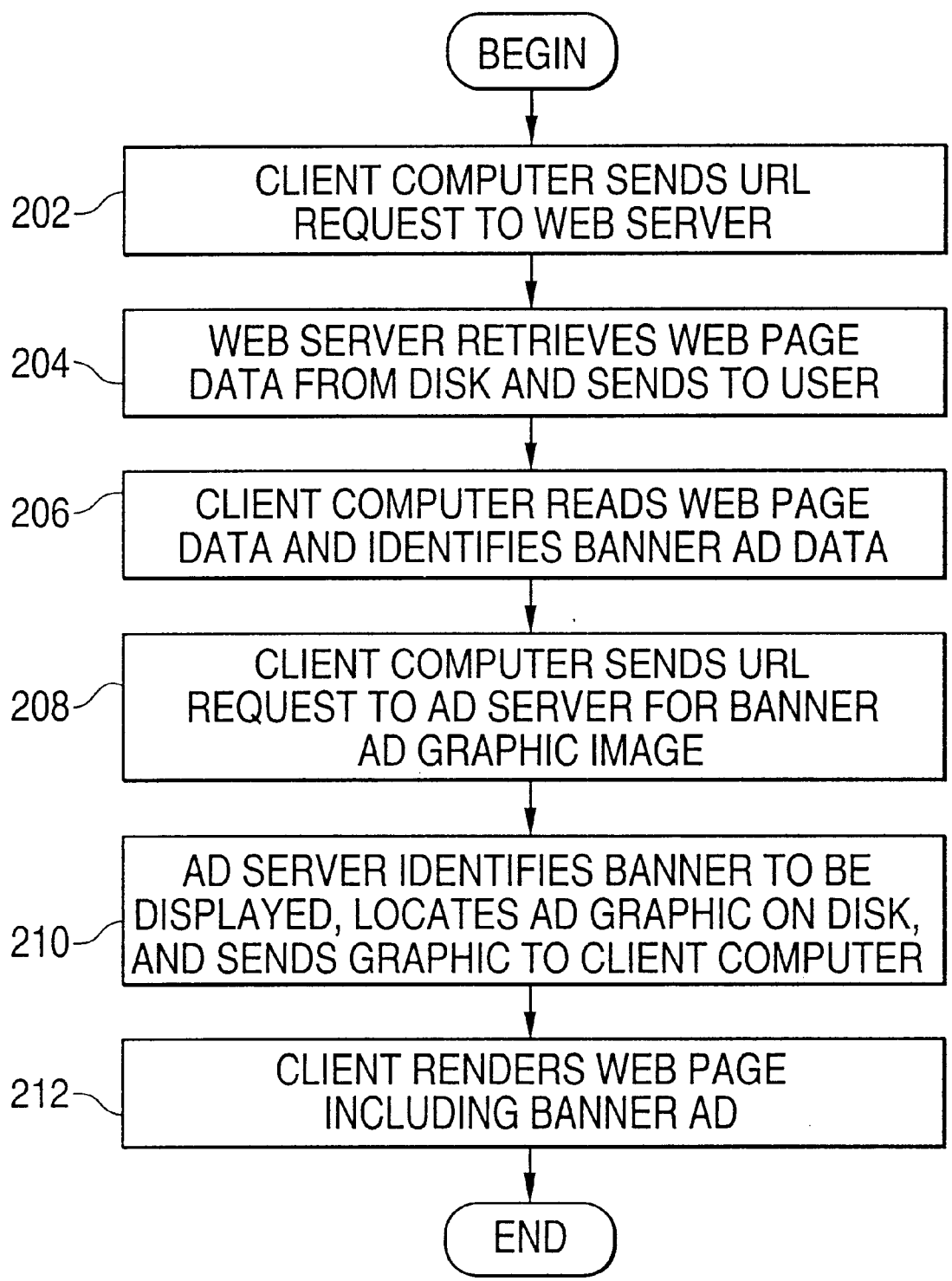
Figure 3:
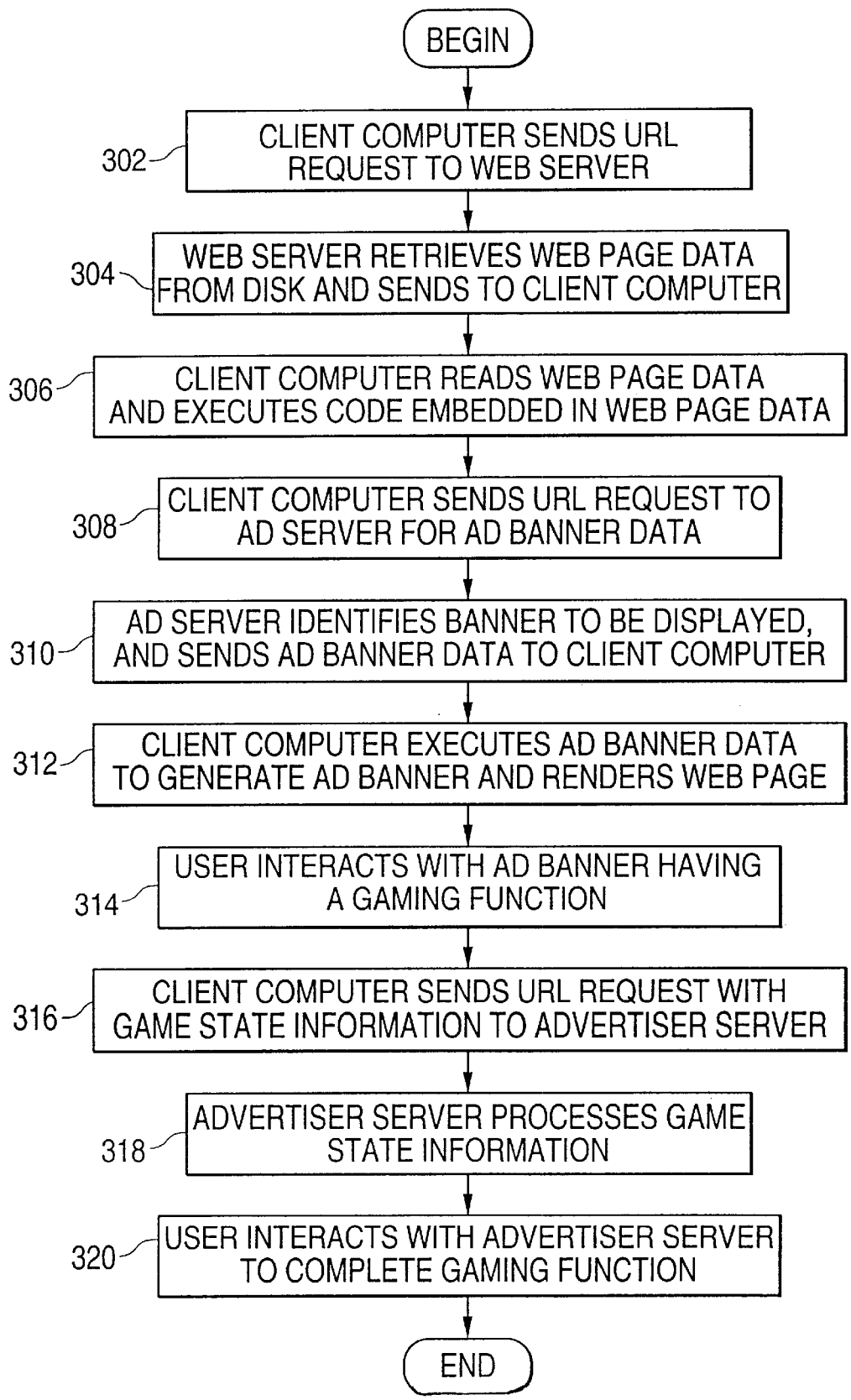
Figure 4:
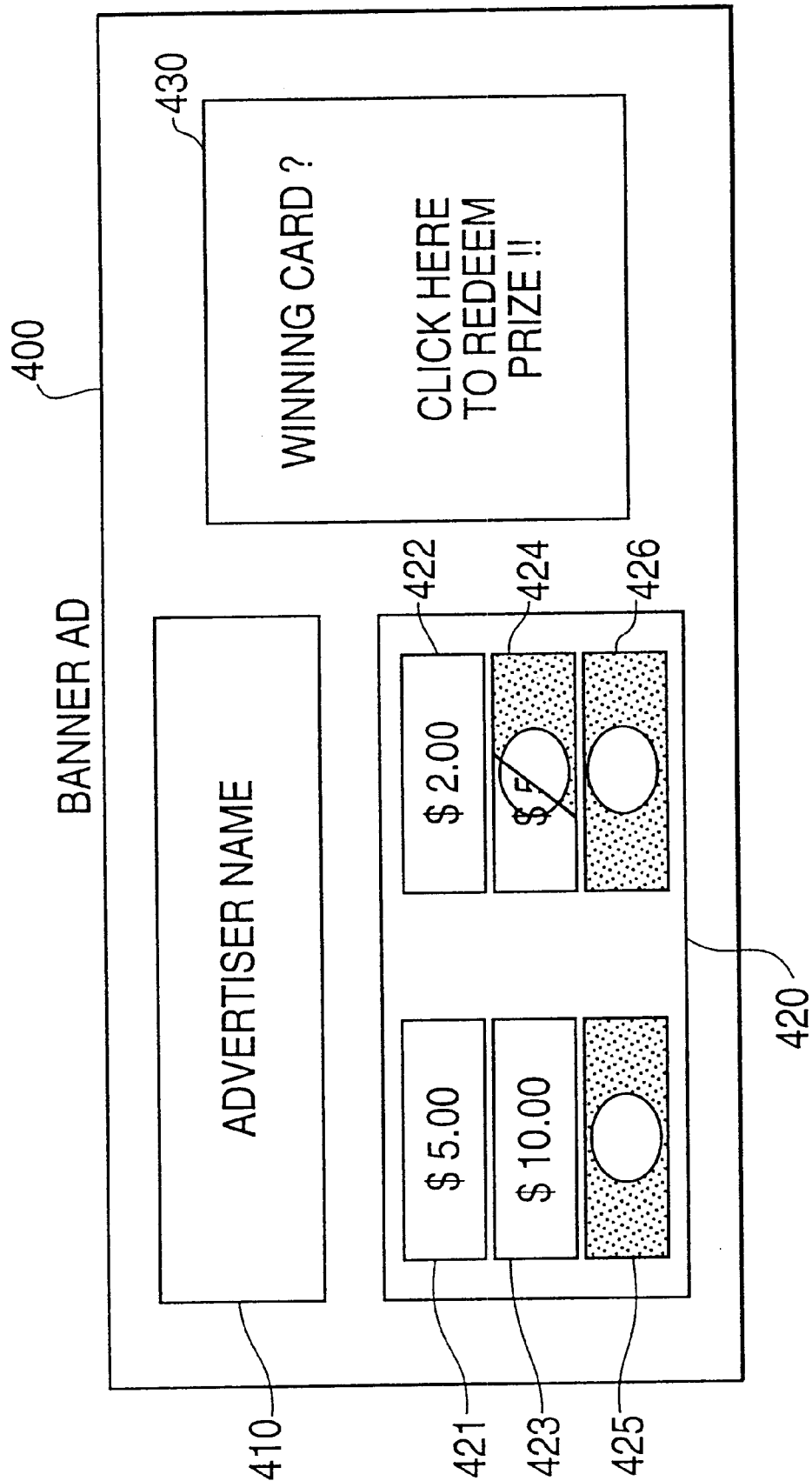

In the drawings:

FIGS. 1 and 5 illustrate banner ad delivery systems;

FIGS. 2, 3, and 6 illustrate flow charts of the processing steps in delivering an banner ad to a client computer; and FIGS. 4 and 7 illustrate examples of interactive banner ads.

DETAILED DESCRIPTION OF THE PREFERRED EMBODIMENTS

Reference will now be made in detail to the preferred embodiments of the present invention, examples of which are illustrated in the accompanying drawings.

Banner advertising on the web is ubiquitous. Each generated page view includes one or more banner ads that are directed to the targeted user. One example of a banner ad delivery system is illustrated in FIG. 1. Banner ad delivery system 100 includes web server 110, ad server 120, and client computer 130. a typical interaction between web server 110, ad server 120, and client computer 130 is illustrated in FIG. 2.

The add delivery process begins in step 202 where client computer 130 under control of a user sends a uniform resource locator (URL) request to web server 110. Upon receiving the URL request, web server 110, in step 204, retrieves the web page data from storage device 112 and sends the web page data to client computer 130. In one embodiment, the web page data includes hypertext markup language (HTML) code.

The web page data is used by client computer 130 to visually render the web page. The web page data includes banner ad data. The banner ad data identifies a source of the banner ad graphic location, the area of the screen dedicated to the banner ad, the location of the merchant's web site, etc. The graphics for the banner ad are stored in ad server 120. In one embodiment, the banner ad data includes an HTML image pointer tag that specifies the URL for the source of the banner ad graphic and the URL for the merchant's web site.

At step 206, client computer 130 parses through the web page data and identifies the banner ad graphic image data. As noted, the banner ad data informs client computer 130 that the source of the ad graphic is ad server 120. Thus, to successfully render the web page, client computer 130 sends, in step 208, a URL request to ad server 120 for the banner ad graphic image to be displayed in the area of the web page dedicated to the banner ad. In step 210, ad server 120 identifies the banner ad to be displayed by client computer 130, locates and retrieves the associated banner ad graphic image data from storage device 122, and sends the banner ad graphic image data to client computer 130. In one example, the banner ad graphic image data is either a compressed graphics interchange format (GIF) file or a joint photographic experts group (JPEG) file.

The banner ad delivery process is completed in step 212 where client computer 130 receives the banner ad graphic image data from ad server 120 and displays the image defined by the banner ad graphic image data on the area of the web page set aside for the banner ad. As noted, the banner ad is both an advertisement and a link to the merchant's web site. If the user viewing the web page that is displayed on client computer 130 finds the banner ad appealing, the user can click on the banner ad and be transferred or linked to the merchant's web site. While this action is the most desired result of the advertising campaign, it occurs on average less than 2% of the time that the banner ad is viewed by the user population. Advertising rates that are tied to the click-through rates are therefore directly impacted by the ability of the banner ad to generate user interest.

The present invention improves upon the static banner ad delivery system by increasing the user's ability to interact with the banner ad that is displayed on the web page. The user interactivity described below greatly enhances the click-through rates as compared to the delivery of conventional static banner ad graphic images.

FIG. 3 illustrates a flow chart of the processing steps that are performed in the banner ad delivery system and method of the present invention. These processing steps are performed by the same functional entities (i.e., web server 110, ad server 120, and client computer 130) as illustrated in FIG. 1.

The first two steps 302, 304 of the process of FIG. 3 are substantially the same as the first two steps 202, 204 of the process of FIG. 2. In step 302, client computer 130 under control of a user sends a URL request to web server 110. Upon receiving the URL request, web server 110, in step 304, retrieves the web page data from storage device 112 and sends the web page data to client computer 130.

In the static banner ad delivery process of FIG. 2, the web page data includes an HTML image pointer tag that specifies the URL for the source of the banner ad graphic image data. In the interactive banner ad delivery process of FIG. 3, on the other hand, the web page data includes an embedded portion of code that dynamically generates the HTML code that is used to generate the banner ad. This embedded portion of code can be written in JavaScript, dynamic HTML, or any equivalent coding language that is recognized by the user's browser. In step 306, client computer 130 executes the portion of code. Upon execution, the embedded portion of code instructs client computer 130 to send a URL request to ad server 120 to retrieve banner ad data. The URL request is sent to ad server 120 in step 308.

Next, in step 310, ad server 120 determines the type of ad that should be displayed, and returns banner ad data to client computer 130. The banner ad data is used by the client computer 130 to generate the banner ad. Typically, the banner ad data will include more than just banner ad graphic image data (e.g., GIF or JPEG files).

In one example, the banner ad data is represented by a segment of HTML code that includes text, image pointer tags, and applet tags. Upon execution of the segment of HTML code in step 312, client computer 130 will then proceed to retrieve all of the pieces of data necessary to generate the banner ad. This process can include the retrieval of banner ad image graphic data and applet executable code (e.g., Java applet) from ad server 120. The receipt of applet executable code greatly expands upon the types of banner ads that can be displayed. Instead of displaying static banner ad graphic images defined by one or more GIF or JPEG files, the applet executable code enables client computer 130 to render banner ads that can interact with the user.

This interactivity greatly increases the effectiveness of the banner ads in promoting the desired result of having the user click-through to the merchant's web site. One form of interactivity is an Internet version of a scratch-off game. In this process, the applet executable code coordinates the display of a scratch-off game card on a portion of a banner ad. The scratch-off game cards can include one or more gaming image symbols that are defined by ad server 120. The one or more gaming images symbols are obscured on the banner ad by secondary images. Using a pointing-type device, the user moves a cursor over a secondary image to effect a replacement of the portions of the secondary image defined by movement of the cursor with an associated portion of an obscured gaming symbol image. As portions of the obscured gaming symbol image are sequentially revealed, the user will be able to get a clearer and clearer idea of the gaming symbol image that has been defined by ad server 120. This Internet scratch-off feature is described in greater detail in Applicants' co-pending U.S. application Ser. No. 08/805,134, entitled "Internet Scratch-Off Game," filed Feb. 24, 1997, which is hereby incorporated by reference in its entirety.

The Internet scratch-off feature represents one type of user interactivity that can be applied to banner ads. This feature enables advertisers to increase user interest through interactivity with the banner ad. It should be noted, however, that increasing the user interactivity with the banner ad does not necessarily guarantee that the desired goal of the advertising campaign will be accomplished. More specifically, user interactivity with the banner ad will not necessarily result in an increase in click-throughs to the merchant's web site. Accordingly, banner ad interactivity is valuable only if it produces a greater click-through rate.

The implementation of a unique form of user interactivity to produce increased click-through rates is a feature of the present invention. In this feature, user interactivity is particularly focused on a gaming function that can only be completed by the continued interactivity by the user with the merchant's server (not shown). This multi-server interactivity with the user results in greater click-through rates.

For example, consider the delivery of a scratch-off feature within banner ad 400 illustrated in FIG. 4. Banner ad 400 includes three primary areas 410, 420, and 430. Area 410 includes a general identifier for the advertiser that is sponsoring the banner ad, area 420 includes an interactive gaming area, and area 430 includes an encouragement for promoting the click-through to the advertiser's site.

Banner ad 400 is in sharp contrast to banner ads that rely on one or more static graphic images. These static banner ads induce click-throughs using standard advertising gimmickery. This standard gimmickery often promises free items, reduced prices, the "best" deal, etc. Significantly, these ads have induced a great deal of skepticism among the browsing public, and have therefore resulted in an increasingly underwhelming response.

Advertising banner 400, on the other hand, represents a fundamental change in banner ad inducement. Specifically, the delivery of applet executable code by ad server 120 enables client computer 130 to display an banner ad having an interactive gaming portion within area 420. In the example of FIG. 4, interactive gaming portion 420 includes a scratch-off game card having six symbol areas 421–426. Symbol areas 421–426 each include mask images that can be effectively removed by movement of a cursor in the respective areas. As illustrated in FIG. 4, the mask images of symbol areas 421–423 have been entire removed, the mask image of symbol area 424 has been partially removed, and the mask images of symbol areas 425–426 have not been removed. After all six mask images are removed, the user will be able to determine whether interactive gaming portion 420 included within the banner ad 400 displayed on client computer 130 is a winning game card (e.g., matched three symbol values within symbol areas 421–426). This user interactivity with the banner ad having a gaming function is represented by step 314 of the flowchart of FIG. 3.

Having identified a winning game card, the user can then decide whether to claim the prize. As the instructions in area 430 state, the prize can be redeemed by clicking through banner ad 400. This click-through process is represented by step 316 of the flowchart of FIG. 3.

Prior to describing the click through process in greater detail, it should be noted that the interactive gaming portion 420 may have no connection to products or services on the merchant's web site. Example banner ad 400 was chosen to illustrate this concept. The lack of connection between banner ad 400 and the merchant's web site demonstrates the underlying power of the interactive gaming portion 420 in producing a higher click-through rate. Unlike conventional banner ads that merely advertise products or services of the advertiser's site, click-throughs can be gained simply by offering people an incentive to visit the site. This concept would be analogous to a real-world advertising scenario of telling pedestrians that they can claim a sum of money by physically entering a store. Once the pedestrian enters the store, the content within the store may serve as an inducement for the pedestrian. Most people would be skeptical of this type of real-world practice because they would not believe that they had a right to the sum of money. In other words, they would undoubtedly believe that there was some "catch." Banner ad 400 does not suffer from this level of skepticism because most users would view the game card displayed in interactive gaming portion 420 as evidence of their right to the prize.

In alternative scenarios, the interactive gaming portion could be connected to products or services that are available at a merchant's web site. For example, instead of having a scratch-off game card having flat dollar figures, the scratch-off game card could have coupon dollar figures. In this case, the motivation of receiving a prize would be combined with the attractiveness of the merchant's products or services. In either case, the implementation of an interactive gaming portion 420 within banner ad 400 increases the motivation of the user to visit the merchant's web site.

After the user has completed the interaction with the interactive gaming portion 420 of banner ad 400, the user can then determine, based upon the content of the interactive gaming portion 420, whether the user has won a prize. Having determined that a prize has been won, the user's next action is based upon the content of area 430 of banner ad 400. In the example of FIG. 4, the banner ad encourages the user to simply click-through to the merchant's web site to claim the prize identified in the winning scratch-off game card shown in area 620. In the click-through process of step 316, client computer 130 sends a URL request to the merchant's server.

As described, each banner ad can include a distinct game card within interactive gaming portion 420. In a preferred embodiment, the game card displayed in interactive gaming portion 420 is one of a plurality of possible game cards. Accordingly, the individual game cards should be identified by the merchant's server in order to determine what prize the user has won. In a preferred embodiment, this game card identifying information is provided by client computer 130 to the merchant's server as part of the URL request that is generated in the click-through process of step 316. In a further embodiment, the game card identifying information is accompanied by verifying information (e.g., using cryptographically secured tokens) that validates the game card identifying information.

More generally, the game card identifying information is included as part of the game state information that is provided to the merchant's server. The game state information could additionally include game information generated during the execution of the applet executable code as part of the interactive gaming process. For example, additional information such as time parameters (e.g., speed of play, number of guesses, etc.), user key input, etc., could be used by the merchant's server in determining what prize that user has won.

Upon receipt of the game state information that accompanies the URL request, the merchant's server processes the game state information in step 318. In one example, the game state information processing includes a single step of using a game card identifier to look up a prize value. More generally, the merchant's server could use the game state information as inputs to a multi-variable prize determination equation. Depending upon the particular implementation, suitable verification mechanisms could be employed to ensure the validity of the received game state information. These security mechanisms would be apparent to one of ordinary skill in the relevant art.

Having clicked-through to the merchant's web site, the user is then able to complete the gaming function. The completion of the gaming function in step 318 could be embodied in various ways. In the example gaming function illustrated by banner ad 400, the completion of the gaming function is represented by the act of the user in claiming the prize identified by interactive gaming portion 420. In one embodiment, the process of claiming the prize includes the steps of filling out a claim form (e.g., name and address information) at the merchant's web site after the game state information that was included within the URL request has been examined and verified.

The example scratch-off game card illustrated within interactive gaming portion 420 of banner ad 400 represents one type of play style. Other types of play styles can be used to generate a similar type of user interest. For example, interactive gaming portion 420 could include (1) a scratch-off portion that will reveal the left side of an X-dollar bill (or picture), wherein the user will win the X-dollars (or prize) if the right-hand side of the X-dollar bill (or picture) is found at the merchant's web site; (2) a scratch-off portion that will reveal a number, wherein the user will win a prize if the matching number is found at the merchant's web site; (3) a scratch-off portion that will reveal a number, wherein if the number is greater than the one displayed at the merchant's web site, then the user can scratch-off a prize box to see what they've won; (4) a scratch-off portion that will reveal a poker card hand, wherein if the user's poker card hand beats the dealer's hand found at the merchant's web site, then the user can scratch-off a prize box to see what they've won; (5) a scratch-off portion that will reveal a set of letters, wherein if the merchant's web site has the missing letters, then the user can scratch-off a prize box to see what they've won; etc. Many other scratch-off or other general game styles can be implemented within interactive gaming portion 420.

In conventional banner ads, click-throughs are achieved by the physical acts of moving a mouse pointer to the banner ad displayed on the screen and clicking on the mouse. This mouse click process represents a standard means of web navigation using hyperlinking.

It is a further feature of the present invention that the click-through process can also be integrated with the user actions that are carried out in a user interactive area of a banner ad. To illustrate this integrated click-through process, consider banner ad 700 of FIG. 7. Banner ad 700 represents a simple example of an interactive banner ad. Banner ad 700 includes area 710 that presents the advertiser's name, area 720 that provides instructions for a user, and interactive area 730.

In this example banner ad, the user is simply instructed to scratch off the secondary image displayed in area 730 to reveal an image of a prize value. As illustrated, the user has partially uncovered the underlying image of a dollar figure. The user will typically proceed to scratch off enough of the cover image such that the user is able to recognize a prize value.

Having revealed (or discovered) a prize value, the user would then desire to claim the prize. As noted above, completion of a gaming function will typically occur at a merchant's web site. Reaching the merchant's web site can be accomplished in a conventional manner such as clicking on area 430 of banner ad 400 of FIG. 4, thereby initiating a standard click-through.

Alternatively, the click-through process can be achieved automatically. With reference to banner ad 700, the click-through process can be initiated based upon various indicia of user interactivity within interactive area 730. In one embodiment, indicia of user interactivity within interactive area 730 is based upon the recognition of certain mouse events including a mouse click, a mouse release, a mouse entering a component area, a mouse leaving a component area, etc.

Based upon these types of indicia of user interactivity, the click-through process can be initiated automatically via the applet executable code. In one embodiment, the click-through process is initiated automatically upon the stoppage of the user's scratching within interactive area 730. In another embodiment, the click-through process is initiated automatically after the lapse of a predetermined period of time (e.g., 2 seconds) after the user has initiated or stopped the scratch process within interactive area 730. In a still further embodiment, the click-through process is initiated automatically after the system determines that enough of the cover image has been scratched off. As user interactivity with the banner indicates a willingness to participate with the general advertising campaign, the automatic transfer of the user to the merchant's web site would not be considered by the user as an offensive act.

Automatic click-throughs can be performed regardless of the content of interactive area 730. In other words, if a gaming function is implemented within interactive area 730, the automatic click-through process can be initiated without regard to the prize value or game state. In this scenario, the marketing campaign can be designed such that all game cards (or scenarios) in interactive area 730 are winning game cards (or scenarios). Alternatively, the marketing campaign can be designed such that all users will either win the stated prize or receive a consolation prize. Generally, this scenario represents the most desirable form of banner advertising mechanisms because it ensures that all users that express some form of willingness to interact with the banner ad are ultimately clicked-through to the merchant's web site.

In an alternative embodiment, the automatic click-through process is based upon some aspect of the content of interactive area 730. For example, if a gaming function is implemented within interactive area 730, the automatic click-through process can be initiated only if the system determines that the game card is a winning game card. A simple threshold analysis of a game card value could be used to effect this determination. As would be appreciated by one of ordinary skill in the relevant art, the particular method of determining whether a game card is a winning game card is dependent upon the type of gaming function implemented within interactive area 730.

Losing game cards could invoke a variety of actions by the system. The most undesirable action would be to end the possibility of obtaining a click-through. More desirable actions include the request of whether the user wishes to click-through to the merchant's web site to claim a consolation prize, a chance to play another game, etc.

System actions that are based upon interaction by a user with interactive areas of a banner ad are ideally designed to create a seamless extension of a merchant's web site. Conventional banner ads represent a hit-or-miss click-through proposition. Interactive banner ads that incorporate features of the present invention, on the other hand, enable a merchant to entice participation with the banner ad without having the user commit to visiting the merchant's web site. The user's perception of the apparent lack of commitment to visit the merchant's web site is to a certain degree misplaced. System actions can be artfully designed such that the initiation of user interaction with the banner ad will almost assuredly result in a click-through that is not offensive in nature. For example, transferring users to a merchant's web site to receive a nominal consolation prize is likely to be perfectly acceptable to a user population. In this manner, the interactive banner ad that incorporates features of the present invention represents a significant paradigm shift in banner ad usage. Conventional banner ads create click-throughs only if true interest is created in the user. Banner ads of the present invention, on the other hand, can create click-throughs for interested users as well as largely uninterested users. The click-through goal is thereby achieved to a higher degree using the features of the present invention.

FIG. 5 illustrates an alternative embodiment of a banner ad delivery system. As compared to ad delivery system 100, banner ad delivery system 500 includes an in-house ad server 520. In-house ad server 520 is directly accessed by web server 110 during the banner ad delivery process. In-house ad server 520 is not accessed by client computer 130 during the banner ad delivery process. The operation of banner ad delivery system 500 is illustrated in the flowchart of FIG. 6.

In step 602, client computer 130 under control of a user sends a URL request to web server 110. Upon receiving the URL request, web server 110, in step 604, retrieves the web page data from storage device 112. Unlike the process of FIG. 3, web server 110 does not immediately send the web page data to client computer 130. Rather, in step 606, web server 110 parses through the web page data (e.g., HTML code) and identifies the need for ad banner data. Web server 110 then sends a banner ad request to in-house ad server 520 in step 608.

Next, in step 610, ad server 120 determines the type of banner ad that should be displayed, and returns the appropriate banner ad data to web server 110. As noted, the banner ad data will typically include more than just banner ad graphic image data (e.g., GIF or JPEG file). In one example, the banner ad data is represented by a segment of HTML code that includes text, image pointer tags, and applet tags. In step 612, this segment of HTML code is inserted into the web page data that is sent to client computer 130.

In step 614, client computer 130 executes the segment of HTML code then proceeds to retrieve all of the pieces of data necessary to generate the banner ad. This process can include the retrieval of image graphic data and applet executable code (e.g., Java code) from ad server 520 via web server 110. As noted, the receipt of applet executable code enables client computer 130 to render banner ads that can interact with the user.

After the web page is rendered by client computer 130, the user, in step 616, can interact with the banner ad having a gaming function. In the example banner ad of FIG. 4, if the user identifies a winning game card, the user can then decide whether to claim the prize. The banner ad encourages the user to simply click-through to the merchant's web site to claim the prize identified in the winning scratch-off game card shown in area 420. In the click-through process of step 618, client computer 130 sends a URL request to the merchant's server. In the same manner as described with respect to the process of FIG. 3, the user can complete the gaming function after the merchant's server processes the game state information in step 620. The completion of the gaming function occurs in step 622.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for increasing click-through rates for Internet banner advertisements, the method comprising the steps of:
    (a) transmitting a first uniform resource locator request to a first web server;
    (b) receiving web page data from said first web server, said web page data including banner ad data that identifies the source of one or more components to be used in rendering a banner ad in the web page defined by said web page data;
    (c) transmitting a second uniform resource locator request to a second web server, said second uniform resource locator request identifying at least one component to be used in rendering said banner ad;
    (d) receiving, from said second web server, computer program logic for storage on a computer usable medium in a client computer, said computer program logic including a means for enabling a processor in said client computer to implement a user interactive gaming function within a portion of said banner ad, wherein said user interactive gaming function is completed by interaction with a merchant web server; and
    (e) transmitting a third uniform resource locator request to said merchant web server, said third uniform resource locator request including game state information that is indicative of a state of said user interactive gaming function, wherein said game state information is processed by said merchant server to determine whether said user is qualified to win a prize.

2. The method of claim 1, wherein step (d) comprises the step of receiving computer program logic for storage on a computer usable medium in a client computer, said computer program logic including
    first means for enabling a processor in said client computer to display at least one secondary image on a display screen, said at least one secondary image corresponding to at least one gaming symbol image; and
    second means for enabling said processor in said client computer to replace a portion of said at least one secondary image on said display screen with a corresponding portion of said at least one gaming symbol image, wherein said portion defines a display area that corresponds to a display area covered by the movement in a cursor position.

3. The method of claim 2, wherein step (e) comprises the step of transmitting a third uniform resource locator request to said merchant web server, said third uniform resource locator request including an identifier of said at least one gaming symbol image.

4. A method for increasing click-through rates for Internet banner advertisements, the method comprising the steps of:
    (a) transmitting a first uniform resource locator request to a first web server;

(b) receiving web page data from said first web server, said web page data including banner ad data that identifies the source of one or more components to be used in rendering a banner ad in the web page defined by said web page data;

(c) transmitting a second uniform resource locator request to a second web server, said second uniform resource locator request identifying at least one component to be used in rendering said banner ad;

(d) receiving, from said second web server, computer program logic for storage on a computer usable medium in a client computer, said computer program logic including first means for enabling a processor in said client computer to display at least one secondary image on an interactive portion of said banner ad, said at least one secondary image; and second means for enabling said processor in said client computer to replace a portion of said at least one secondary image on said display screen with a corresponding portion of at least one symbol image, wherein said portion defines a display area that corresponds to a display area covered by the movement in a cursor position; and (e) automatically transmitting a third uniform resource locator request to a merchant web server based upon an examination of user interaction within said interactive portion of said banner ad.

5. The method of claim 4, where step (e) comprises the step of automatically transmitting a third uniform resource locator request to a merchant web server upon a stoppage of a user's scratching within said interactive portion of said banner ad.

6. The method of claim 4, where step (e) comprises the step of automatically transmitting a third uniform resource locator request to a merchant web server after a lapse of a predetermined period of time after a user has initiated scratching within said interactive portion of said banner ad.

7. The method of claim 4, where step (e) comprises the step of automatically transmitting a third uniform resource locator request to a merchant web server after a lapse of a predetermined period of time after a user has stopped scratching within said interactive portion of said banner ad.

8. The method of claim 4, where step (e) comprises the step of automatically transmitting a third uniform resource locator request to a merchant web server after a user has scratched off a sufficient portion of said at least one secondary image in said banner ad.

* * * * *